May 4, 1954      J. M. PHILLIPS      2,677,575
SAFETY LATCH FOR DUMP TRUCKS
Filed April 14, 1950      2 Sheets-Sheet 1
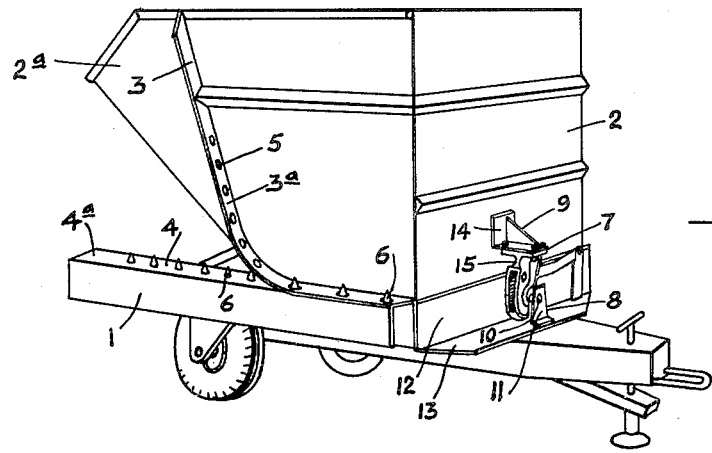
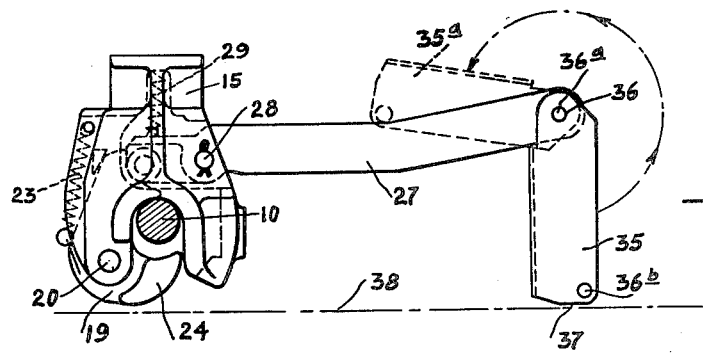
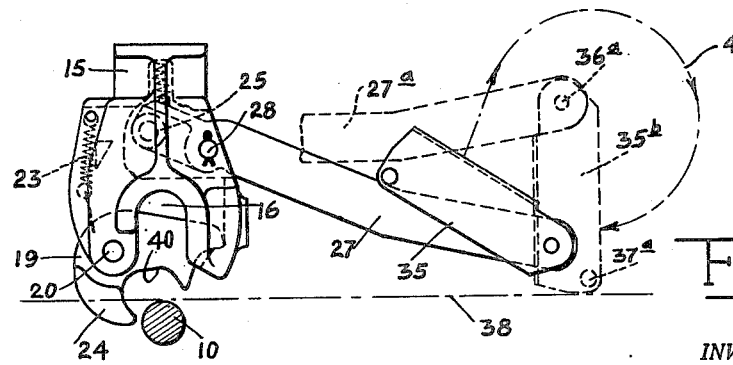
INVENTOR.
JAMES M. PHILLIPS
ATTORNEYS.

May 4, 1954  J. M. PHILLIPS  2,677,575
SAFETY LATCH FOR DUMP TRUCKS
Filed April 14, 1950  2 Sheets-Sheet 2

INVENTOR.
JAMES M. PHILLIPS
BY
Christy, Parmelee & Strickland
ATTORNEYS.

Patented May 4, 1954

2,677,575

UNITED STATES PATENT OFFICE 2,677,575

SAFETY LATCH FOR DUMP TRUCKS

James M. Phillips, Pittsburgh, Pa., assignor to Phillips Mine and Mill Supply Company, Pittsburgh, Pa., a corporation of Pennsylvania Application April 14, 1950, Serial No. 155,859

3 Claims. (Cl. 298—38)

1

This invention relates to a safety latch for dump trucks of the automatic self-unloading or dumping type.

The latching apparatus of this invention is particularly adapted for controlling the operation of dump trucks having a body constructed to move automatically to an unloading position in response to manual operation of latching mechanism. Such dump trucks are commonly provided with a chassis on which the wagon body is mounted for a rolling movement from a charge receiving or loading position to a charge dumping position. For this purpose, the body is provided with side flanges for rolling engagement on chassis frame flanges having projecting parts receivable in openings in the body flanges to confine movement of the body to a rolling movement relative to the truck chassis. The wagon body is so designed that the weight of material deposited therein will create a gravitational unbalance tending to roll the truck body to a dumping position. Suitable latching mechanism is provided for latching the body against movement out of its charge receiving position together with a lever for operating the latch to release the body for movement to its dumping position.

Dump wagons of the type referred to above are subjected to rough usage, and the latch operating lever is apt to be operated accidentally. Accidental operation of the latch operating lever results in a latch releasing operation thereby resulting in an undesired movement of the dump wagon to a charge dumping position.

One of the principal objects of this invention is to provide an improved form of latching mechanism for dump wagons of the type referred to in which a guard is provided for preventing an accidental operation of the latch releasing lever.

Another object of this invention is to provide a dump wagon with latching mechanism which will re-engage automatically upon movement of the dump wagon to a charge receiving position together with a guard for preventing uncontrolled movement of the latch operating lever and mechanism for returning the guard automatically to an operative guarding position upon movement of the dump wagon to a latched and charge receiving position.

A further object of the invention is to provide a guard which will move automatically to an operative position for preventing unlatching of a wagon body of the self-dumping type in response to movement of the wagon body to a charge receiving position.

Other objects and advantages of the invention will become apparent from the following description.

In the drawings, there is shown a preferred embodiment of the invention. In this showing:

Fig. 1 is a perspective view of a dump wagon having an improved latching mechanism constructed in accordance with the principles of this invention for latching the dump wagon against movement relative to its chassis;

Fig. 2 is an enlarged end elevational view of the latching mechanism shown in Fig. 1 with the parts shown in an operative latching position, the latch pin secured to the wagon chassis being shown in section;

Fig. 3 is a view similar to Fig. 2 with the latching parts shown in their released position unlatching the body for movement to a dumping position;

Figure 4:
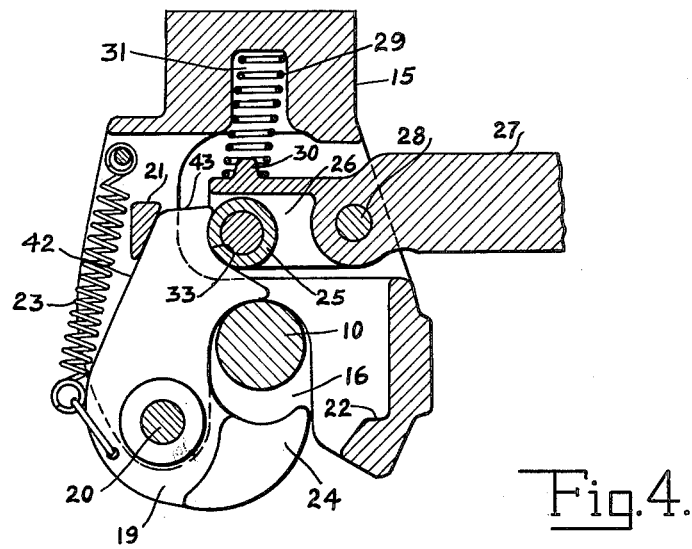
Fig. 4 is an enlarged fragmentary sectional view illustrating in detail the structure of the latch mechanism.

In Fig. 1 of the drawings there is shown a dump wagon of the type with which this invention is concerned. In this showing, the numeral 1 designates a chassis having a wagon body 2 mounted thereon. The sides of the body 2 are provided with flanges 3 for supporting and rolling engagement on horizontal flanges 4 at the sides of the chassis frame 1. The flanges 3 are provided with a plurality of openings 5 through which conical shaped members 6 on the flanges 4 are adapted to project as the flange 3 rolls on the flange 4. The intermeshing engagement of the members 6 in the openings 5 is effective to confine movement of the body 2 to a rolling movement with respect to the frame 1.

The position of the body 2 illustrated in Fig. 1 is a charge receiving or loading position. The wagon 2 has a hopper shape such that when it is charged with material there will be provided a gravitational unbalance effective for rolling or rotating the body 2 in a counter-clockwise direction from a loading position in Fig. 2 to a dumping position. Latch mechanism indicated as a whole by the numeral 7 is provided for latching the body 2 in the position shown in Fig. 1 against rolling movement to a dumping position. Upon operation of the latch mechanism 7 to release the body 2 for movement to a dumping position, the gravitational unbalance of the material in the body 2 will cause the flange 3 to roll on the flange 4 with a corresponding movement of the body 2 in a counter-clockwise direction, as viewed in Fig. 1, to a charge dumping position. The rolling of the body 2 in a counter-clockwise direction will continue until the flat portion 3a of the flange 3 is in abutting engagement with the end portion 4a of the flange 4. As the flat flange portions 3a and 4a move into abutting engagement, the body 2 will be in a dumping position and the material contained therein will be discharged out of the hopper end 2a of the body 2. After the material has been discharged from the body 2, it automatically rolls in a clockwise direction by the gravitational unbalance of the empty body to the position shown in Fig. 1. As the body is returned to the charge receiving position shown in Fig. 1, the latch mechanism 7 will automatically re-engage to lock the body 2 against movement out of such position. The structure of the dump wagon thus far described forms no part per se of this invention, this invention being limited to the novel structure of the latching mechanism 7 and certain operational features provided thereby which will now be referred to.

The latching mechanism 7 comprises cooperating latch structures indicated as a whole by the numerals 8 and 9 secured respectively to the chassis frame 1 and the body 2. The latch structure 8 comprises a stationary pin 10 having an axis perpendicular to and its ends secured to a mounting flange 11 and a frame element 12 constituting part of the chassis frame 1, the bracket 11 being secured to a flange 13 constituting part of the frame element 12. The pin 10 is stationary relative to the frame 1 and extends between the vertically extending portions of the bracket 11 and frame element 12.

Figure 5:
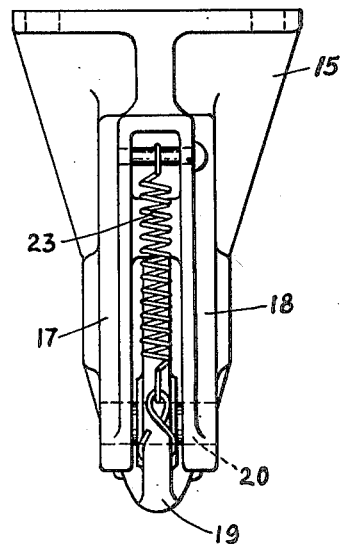
Fig. 5 is an end elevational view of the latching mechanism looking from the left of Fig. 4.

The latch structure 9 comprises a bracket 14 secured to the body 2 and forming a support for a housing 15 in which are mounted the movable parts of the latch structure. The construction and operation of the latch structure 9 will be best understood by referring to the showing of Fig. 4 in connection with the showing of Figs. 2 and 3. From this showing, it will be noted that the housing 15 is provided with a U-shaped notch 16 opening downwardly and into which the pin 10 may move to a position as shown in Fig. 4. The housing 15 is in effect bifurcated and has two side portions 17 and 18, as shown in Fig. 5, forming supports for the operating parts of the latch and between which the operating parts of the latch are mounted. The operating parts of the latch comprise a latching dog 19 pivotally supported by a pin 20 extending between the side parts 17 and 18. The dog 19 is mounted for pivotal movement between the position shown in Figs. 2 and 4 in which it is engaged with the stop member 21, and the position shown in Fig. 3 in which it is engaged with the stop member 22. The dog 19 may pivot between the stops 21 and 22, and the stops 21 and 22 thus operate to limit the pivotal movement of the dog 19 between the operative latching position shown in Fig. 4 and the unlatched position shown in Fig. 3. A spring 23 is provided for biasing the pivotal movement of the dog 19 to the unlatched position shown in Fig. 3. In the latched position shown in Fig. 4, the dog 19 has an end 24 projecting into the outer portion of the notch 16 for preventing movement of the pin 10 relative to the housing 15 and out of the notch 16. The dog 19 is held against movement out of its operative latching position by a roller 25 extending transversely of the bifurcated end 26 of a latch operating lever 27. The latch operating lever 27 is mounted for pivotal movement by a pivot pin 28 extending between the parts 17 and 18 of the housing 15. A spring 29 is provided for biasing the lever 27 and roller 25 carried thereby to the latching position shown in Fig. 4. The end of the lever 27 is provided with a projecting tip 30 which projects into the one end of the spring 29, and the other end spring 29 is positioned in an opening 31 formed in the upper end of the housing 15. The opening or well 31 together with the tip 30 operate to secure the biasing spring 29 in an operative position. With the lever 27 in its operative latching position as shown in Fig. 4, the roller 25 is engaged with a curved surface 33 on the dog 19. The point of engagement between the surface 33 and the roller 25 is so located that the bias applied by the spring 23 is applied radially with respect to the pivot axis of the lever 27 as determined by the location of the pivot 28 so that the biasing force of the spring 23 is ineffective to move the roller 25 out of its operative latching position. Any tendency of the roller 25 to move out of its latching position will of course be resisted by the biasing force applied to the lever 27 by the spring 29.

In order to unlatch the dog 19, the lever 27 is moved downwardly in a clockwise direction from the position shown in Fig. 2 to the position shown in Fig. 3. This action compresses the spring 29 and moves the roller 25 out of engagement with the surface 33, and the dog 19 is thus released for movement in a clockwise direction by its biasing spring 23. The housing 15 will then be freed for movement upwardly by the unbalance due to the weight of the material in the body 2 and the body 2 will move to its dumping position. As the body 2 moves toward its dumping position, the pin 10 will move downwardly relative to the slot 16 and in so moving will strike the latching part 24 of the dog 19 and rotate the dog 19 in a clockwise direction if it has not already been rotated out of the path of the pin 10 by its biasing spring 23.

In order to prevent clockwise movement of the lever 27 to unlatch the body 2 as explained above, a safety lock 35 is provided. The safety lock 35 comprises a link having ears 36 at its upper end which are connected by a pivot 36a to the outer end of the lever 27. The link 35 is normally adapted to occupy an operative vertical position as shown in Figs. 1 and 2 in which it is effective to prevent movement of the lever 27 in a clockwise direction. In this position, its lower end 37 is positioned adjacent the upper surface of the flange 13, diagrammatically indicated by the broken line 38 in Figs. 2 and 3, in which it is operative to prevent downward movement of the lever 27 to an unlatching position. The link 35 may be pivoted from its operative guarding position in a counter-clockwise direction to an inoperative position as indicated by the dotted lines 35a in Fig. 2, in which a pin 36b engages with the upper surface of the lever 27 to support it in such position. When the link 35 is swung to its inoperative position, the lever 27 may of course be operated to unlatch the body 2 for movement to its dumping position. The link 35 when in a vertical position will of course be operative to prevent accidental unlatching operation of the lever 27.

The latching parts thus far described are operative to impart an automatic return of the link 35 from its inoperative position to its operative guarding position, the vertical position shown in Fig. 2, in response to return of the body 2 to its charge receiving or loading position shown in Fig. 1. When the body 2 is returned to its charge receiving position, the pin 10 in moving upwardly into the slot 11 will strike the surface 40 of the dog 19 and pivot the dog 19 in a counter-clockwise direction against the action of the biasing spring 23. This movement will move the dog 19 out of engagement with the stop 22 and into engagement with the stop 21. As the dog 19 moves in a counter-clockwise direction under the action of the pin 10 moving into the slot 16, its surface 42 will strike against the roller 25 and cam the roller 25 upwardly thereby compressing the spring 29. The compression of the spring 29 will be at a maximum as the roller 25 moves out of engagement with the camming surface 42 and on to the surface 43. When the roller 25 is engaged with the surface 43, the lever 27 will be in the position as shown by the solid lines in Fig. 3. As the dog 19 moves into engagement with its stop 21, the roller 25 will move out of engagement with the surface 43 and the roller 25 will move downwardly into operative latching engagement with the surface 33 on the dog 19. The spring 29 is a relatively stiff spring, and is effective to move the lever 27 in a counter-clockwise direction into engagement with the surface 33 with a fast or snap action. In so moving, the lever 27 will move from the position indicated by solid lines in Fig. 3 to the position indicated at 27a in dotted lines. As pointed out above, this movement is accomplished with a snap action as the roller 25 moves into engagement with the surface 33, and the movement of the lever 27 in a counter-clockwise direction under the action of the spring 29 is abruptly arrested as it moves to the position indicated by the numeral 27a. The link 35 is of course carried upwardly with the lever 27 as it moves to the position indicated by the numeral indicated 27a. When the movement of the lever 27 is abruptly stopped in the position 27a, there is nothing to stop the movement of the link 35 and its momentum will cause it to pivot in a clockwise direction as indicated by the circular broken line and arrows 45 to the vertical position indicated by the numeral 35b in Fig. 3. In this position, the link 35 will of course be operative to prevent movement of the lever 27 to effect an unlatching operation of the truck body 2.

From the foregoing, it will be seen that the structure of the latch 7 is such that it is operative to latch the body 2 against movement to a dumping position, and that the latching parts automatically re-engage upon return of the body 2 to its loading position. Moreover, it will be apparent that the provision of the pivoted link 35 and the manner in which it cooperates with the stationary part 13 of the chassis 1 is effective to prevent unauthorized or accidental unlatching movement of the lever 27. In addition, it will be apparent that the arrangement of the locking link 35 and its cooperation with the lever 27 is such that it is automatically moved to its operative guarding position in response to automatic re-engagement of the latching parts of the latch 7 and the return of the body 2 to its operative loading position. With respect to the automatic return of the link 35 to its operative guarding position, attention is directed to the fact that the latching parts of the latch 7 and the manner in which such parts operate to actuate the lever 27 upon automatic re-engagement thereof cooperates with the lever 35 in effecting its automatic return to an operative guarding position.

While I have illustrated and described one specific embodiment of my invention, it will be understood that this is merely by way of illustration, and that various changes and modifications may be made therein within the contemplation of my invention and under the scope of the following claims.

I claim:

1. In a latch for a dump truck having a chassis with a body movable relative thereto between a loading position and a dumping position, the combination which comprises latch parts automatically engageable in response to movement of said body to said loading position for latching said body against movement to dumping position, a pivotal lever controlling said latch parts to release said body for movement to dumping position, a spring compressible by said lever in response to operation thereof to release said latch parts, said latch parts being operable upon automatic engagement thereof for moving said lever against the action of said spring, and a guard pivoted to the end of said lever and adapted to occupy a normal position operative to prevent latch releasing operation of said lever but movable to a second position to allow operation of said lever, movement of said lever by said spring after automatic re-engagement of said latch parts being operative to automatically move said guard from said second to said normal position.

2. In a latch for a dump truck having a chassis with a body movable relative thereto between a loading position and a dumping position, the combination which comprises latch parts respectively on said body and chassis for latching the body against movement from its loading position and mechanism for automatically effecting movement of said latch parts to a latching position in response to return movement of the body to its dumping position, a pivotal lever movable in one pivotal direction to unlatch said body for movement to its dumping position, a spring compressible by said lever in response to operation thereof to unlatch said body, a guard pivoted to the end of said lever and which is operable when in a normal vertical position depending from said lever to prevent latch-releasing operation thereof but which is pivotal to a second position supported on top of said lever permitting latch-releasing operation thereof, a cam operated by said latch parts in response to automatic re-engagement thereof for actuating said lever in said one pivotal direction and for compressing said spring, said cam having a cam surface movable out of operative relation with said lever upon return of said latch parts to their latching position to thereby release the lever for movement by said spring in an opposite pivotal direction, and a stop for limiting movement of said lever in said opposite pivotal direction, the inertia of said guard upon stopping movement of said lever being effective to pivot it from its inoperative position overlying the lever to its operative guarding position depending vertically therefrom.

3. In a latch for a dumping truck having a chassis with a body movable relative thereto between a loading position and a dumping position, the combination which comprises latch parts for latching said body in said loading position, a pivotal lever movable in one pivotal direction to effect an unlatching operation of said latch parts, a guard pivoted to the end of said lever and which is operable when in a normal vertical position depending therefrom to prevent latch-releasing operation thereof but which is pivotal to a second position supported on top of said lever permitting latch-releasing operation thereof, means responsive to return movement of said body to said loading position for moving said lever in a direction opposite said one pivotal direction, a stop for abruptly arresting movement of said lever in said opposite direction, the inertia of said guard upon stopping movement of said lever being effective to pivot it from its second position to the position in which it depends vertically therefrom.

References Cited in the file of this patent

UNITED STATES PATENTS

| Number | Name | Date |
|---|---|---|
| 1,432,487 | Nester | Oct. 17, 1922 |
| 1,484,327 | Heil | Feb. 19, 1924 |
| 1,497,348 | Reichmann | June 10, 1924 |
| 1,554,509 | Kearney | Sept. 22, 1925 |
| 1,662,653 | Young et al. | Mar. 13, 1928 |
| 1,735,065 | Walsh et al. | Nov. 12, 1929 |
| 2,519,153 | Roura | Aug. 15, 1950 |